United States Patent [19]

Shutt

[11] 4,226,457
[45] Oct. 7, 1980

[54] MULTIPLE POSITIONABLE HAND TOOL HOLDER

[76] Inventor: Jeffrey G. Shutt, 516 N. Vista Bonita, Glendora, Calif. 91740

[21] Appl. No.: 41,500

[22] Filed: May 22, 1979

[51] Int. Cl.³ .............................................. B65G 7/12
[52] U.S. Cl. .................................................... 294/15
[58] Field of Search ....................... 294/15, 26, 61, 16; 137/318, 315; 239/231, 272, 309; 81/3.48; 222/91; 145/61 C, 61 G

[56] References Cited

U.S. PATENT DOCUMENTS

| | | | |
|---|---|---|---|
| 3,115,648 | 12/1963 | Redfield, Jr. ........................... | 294/15 |
| 3,269,664 | 8/1966 | Lamb et al. ............................ | 137/318 |
| 3,705,674 | 12/1972 | Fisher .................................... | 294/16 |
| 3,759,559 | 9/1973 | Yuska .................................... | 294/15 |

*Primary Examiner*—James B. Marbert
*Attorney, Agent, or Firm*—Lloyd Spencer

[57] ABSTRACT

A multiple positionable hand tool holder, primarily intended to receive a tool for perforating an irrigation tube for the purpose of installing a drip emitter having a tubular inlet stem; the tool holder having an essentially oval configuration with a peripheral rim and a radial stem provided with a punch or the like, and capable of being held in a multiplicity of positions to permit frequent change in the manner in which the tool holder is held by the user's hand thereby materially reducing fatigue.

Between use of the tool to perforate, the tool holder may be retained at the base ends of one or two fingers, permitting the fingers and thumb to pick up and manipulate a drip emitter so as to insert its inlet stem into the irrigation tube. By continued retension of the tool holder in the user's hand, the chance of losing or misplacing the tool holder in the course of installation of drip emitters is materially reduced.

3 Claims, 6 Drawing Figures

MULTIPLE POSITIONABLE HAND TOOL HOLDER

BACKGROUND AND SUMMARY

Tool handles have been produced which are capable of being held in various positions to reduce fatigue, for example, U.S. Pat. No. 1,980,087. The present application is directed to an improvement thereof and is summarized in the following objects:

First, to provide a hand tool holder having a rim of essentially oval configuration with a radial stem which receives a tool element extending in alignment therewith, a web extends radially inwardly of the rim, a portion of the web being radially enlarged to form opposed flat surfaces readily engageable between the thumb and index or middle finger with the palm of the hand being arched over the opposite side of the rim whereby the handle and tool may be readily turned or oscillated.

Second, to provide a hand tool holder which may be held in the user's hand in a mutiplicity of positions to minimize fatigue when used repeatedly over a long period of time.

Third, to provide a hand tool holder which is particularly adapted to carry a punch tool arranged, for example, for the perforation of irrigation tubing in order to install irrigation emitters, the holder being readily retained by the user's fingers between punch operations to effect installation of the irrigation emitters with minimal chance that the irrigation emitter be misplaced or lost, and also to minimize the time required between punch operations.

DETAILED DESCRIPTION

Figure 1:
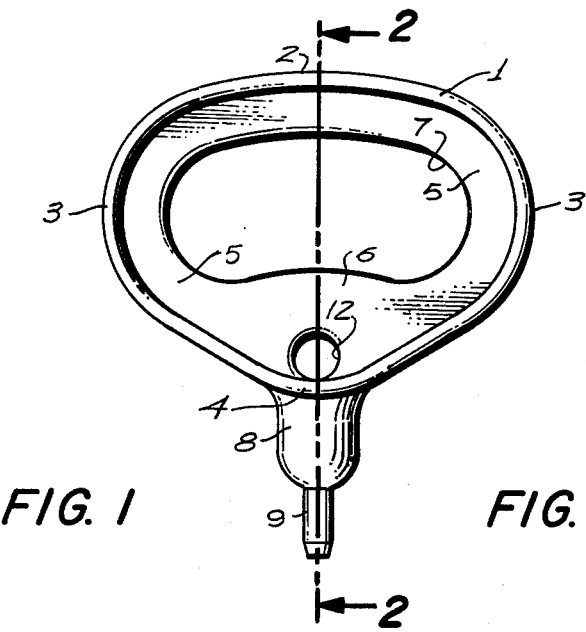
FIG. 1 is a side view of the hand tool holder.
Figure 2:
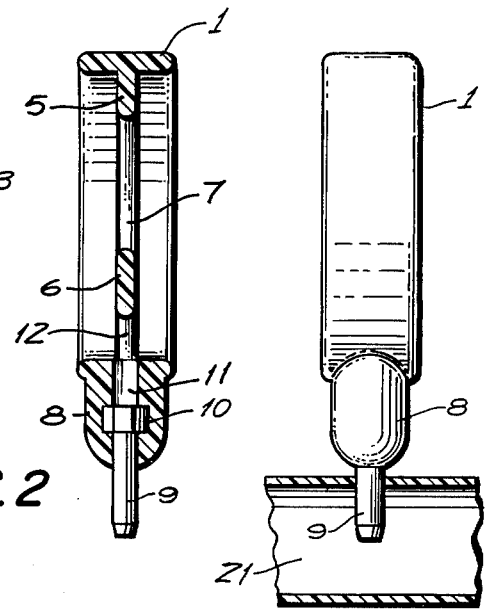
FIG. 2 is a sectional view thereof taken through 2—2 of FIG. 1.

The hand tool holder, which is molded of light weight metal or plastic material, includes an outer peripheral rim 1 of essentially oval shape forming an arched portion 2 of major radius disposed between end arched portions 3 of lesser radius. Opposite from the arch portion 2, the rim is extended as indicated by 4.

Radially inward of the rim 1 is a peripheral web 5, which in the region 4 of the rim, is enlarged radially inwardly as indicated by 6. The inner periphery of the web 5 defines an arched opening 7. Extending from the region 4 of the rim is a stem 8 which receives a tool 9. The tool, as illustrated, is a tubular punch which is molded in place and anchored by a polygonal enlargement 10. Radially inward of the punch tool 9 the stem 8 is provided with a bore 11 intersecting a cross opening 12 formed in the portion 6 of the web for discharge of pellets cut by the punch tool 9.

Figure 5:
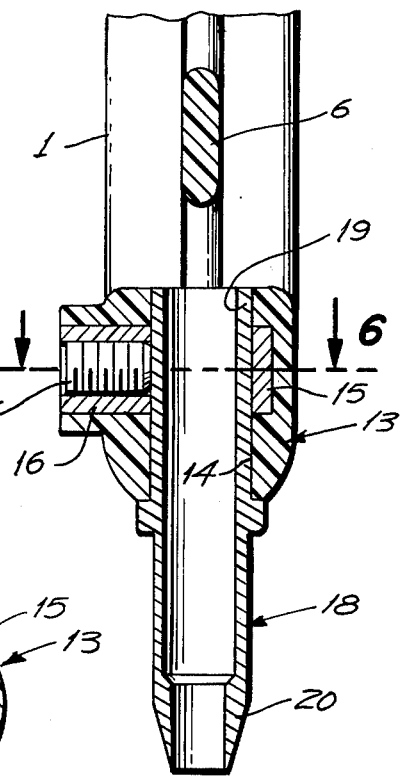
FIG. 5 is an enlarged fragmentary sectional view corresponding to a portion of FIG. 2 showing an embodiment in which a plurality of hand tools may be interchanged.
Figure 6:
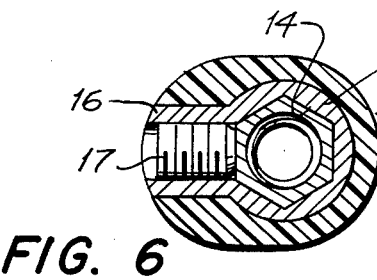
FIG. 6 is a transverse sectional view taken through 6—6 of FIG. 5.

Referring to FIGS. 5 and 6, in order to provide for punch tools of different diameter, a modified stem 13 may be provided, which includes a bore 14 in which is molded an anchor ring 15. The stem 13 may be laterally enlarged to receive a screwthreaded boss 16 projecting from the ring 15, and having a set screw 17. Punches 18, each including a sleeve portion 19, are interchangeably secured within the bore 14 and are provided with cutter extensions 20 of different diameter. Screw drivers or other tools, not shown, may be received in the stem 13 to expand the field of use of the tool holder.

Figure 3:
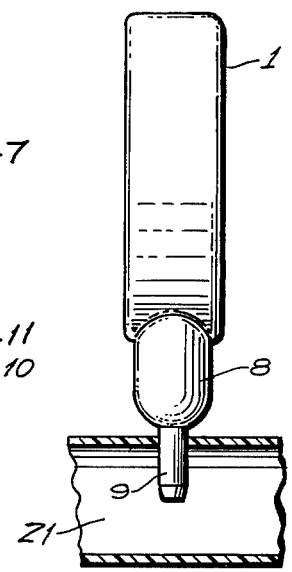
FIG. 3 is an end view thereof.
Figure 4:
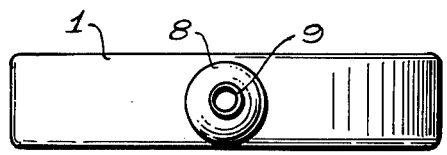
FIG. 4 is a bottom view thereof.

The hand tool holder may be held in a wide variety of positions to reduce fatigue in the hand. This is of substantial importance when the tool is used; for example, to perforate irrigation tubing, such as indicated by 21 in FIG. 3. Such tubing is perforated every one or two feet and several thousand perforations may be made in the field to receive irrigation emitters such as shown in U.S. Pat. Nos. 3,693,888 and 4,113,180.

To illustrate, the range of operating positions of the hand tool holder, include the following:

1. A portion of the palm extending transversely over the arch portion 2 with the thumb extending longitudinally over an end arch portion 3: a. the index and middle finger; or b. the middle and third fingers; or c. the third and little fingers straddling the stem 8.

2. The palm of the hand extending over the arch 2: a. the thumb and index finger; or b. the thumb and middle finger engaging opposite sides of the enlarged region 6 of the web.

3. The middle and third finger, or one of them extending through the opening 7.

It will be noted that, between punching operations, the tool holder remains supported by one or two fingers inserted through the opening 7 while permitting use of the fingers to manipulate and secure an emitter unit in the punched opening. By maintaining the tool holder in the user's hand, the chance of loosing the tool holder is minimized.

Having fully described my invention, it is to be understood that I am not to be limited to the details herein set forth, but that my invention is of the full scope of the appended claims.

I claim:

1. A manual oscillatable cutter tool, comprising:
   a. an annular web dimensioned to be received in a user's hand;
   b. an annular peripheral rim at the radially outer margin of the web and extending laterally therefrom;
   c. a tubular stem extending radially outwardly from the rim;
   d. a tubular cutter extending from within the tubular stem and having a cutting edge at its outer end;
   e. The tubular stem including a radially inwardly extending passageway extending through the web to form a pellet outlet.

2. A cutter tool as defined in claim 1, wherein:
   a. the web and rim are dimensioned to receive the user's fingers in various positions;
   b. an extended portion of the rim receives the palm of the user's hand;
   c. the web is engageable between the user's fingers;
   d. the annular web is dimensioned for cooperation with the user's thumb to hold objects while retaining the web and rim on the user's hand.

3. A cutter tool as defined in claim 1, wherein:
   a. opposed lateral portions of the rim are arranged to be receivable between the user's thumb and a finger.

* * * * *